Oct. 9, 1951  B. G. FRUITHOF  2,571,026
RESONANT CIRCUIT FOR ULTRA-SHORT WAVES
Filed Feb. 5, 1947

B. G. FRUITHOF
INVENTOR
BY
AGENT

Patented Oct. 9, 1951

2,571,026

UNITED STATES PATENT OFFICE 2,571,026

RESONANT CIRCUIT FOR ULTRASHORT WAVES

Barend Gerrit Fruithof, Eindhoven, Netherlands, assignor to Hartford National Bank and Trust Company, Hartford, Conn., as trustee Application February 5, 1947, Serial No. 726,599
In the Netherlands May 24, 1944

Section 1, Public Law 690, August 8, 1946
Patent expires May 24, 1964

2 Claims. (Cl. 178—44)

This invention relates to a resonant circuit, for ultra-short waves having a concentrated capacity which consists of a variable condenser having spiral electrodes and in which at least one of the condenser electrodes has a variable width in a longitudinal direction of the electrode for the obtainment of a capacity varying non-linearly with the axial electrode displacement, which is desirable in view of accurate tuning.

I have found that the variation of the natural frequency in such circuits departs from the variation to be expected in conjunction with the shape of the electrode and, moreover, the quality of the circuit does not come up to the expectations.

The invention has for its purpose to obviate these drawbacks.

To such end care is taken that in any instance after a whole number of turns of the electrode spiral having a variable width the width of the electrode varies stepwise.

The width of the electrode between two stepwise variations of the width is preferably constant.

The invention is based on the following realization: When making use of a spiral electrode, whose width continuously decreases in a longitudinal direction of the electrode, and starting with a condenser adjustment in which the electrodes are moved entirely away from each other a small part of one of the electrode turns will at first become operative upon moving the electrodes together. The charging current for the part of the turn which is then operative results in that around and near the shortest connecting line along the current-carrying circuit surface between the active electrode parts, the current load of the circuit surface will be stronger than elsewhere. In the case of an uneven load, however, the active inductance of the circuit is higher than with an even load of the circuit surface, and at the same time the ohmic losses are higher.

When making use of the invention in its best form of construction, the occurrence of an uneven current distribution is entirely avoided, since upon moving the electrodes together a turn becomes evenly active throughout its length.

Figure 1:
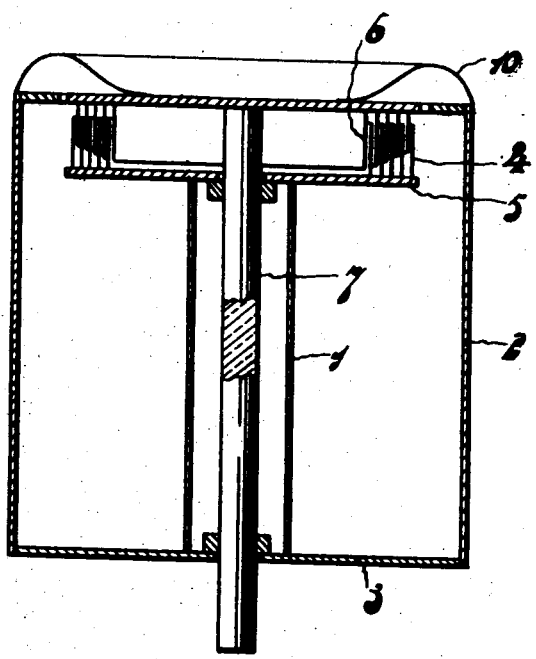

The invention will be more fully explained with reference to Figs. 1 and 2 respectively representing a circuit according to the invention and the development of the condenser electrode used therein, which has a stepwise variable width.

The resonant circuit illustrated comprises two tubular concentric conductors 1 and 2 which are interconnected at the bottom end by a cross piece 3. Furthermore it comprises a concentrated capacity which is realized as a variable spiral condenser, and whose stationary electrode 4 is connected to the upper end of the inner conductor through the intermediary of a cross piece 5, whereas the electrode 6, which is movable in an axial direction, is carried by a porcelain rod 7, journalled in the cross pieces 3, 5, and is galvanically connected to the upper end of the outer conductor 2 by means of an annular foil 10.

The stationary electrode 4 is constituted by a spirally wound band having a constant width.

Figure 2:
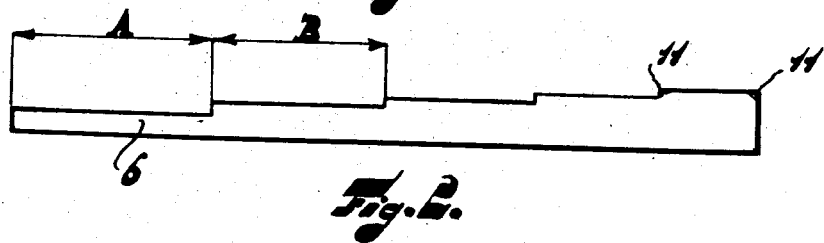

The electrode 6 movable in an axial direction is obtained by bending a metal band in the form of a spiral, the width of this band stepwise varying as shown in Fig. 2 in such a manner that the spiral turns have different widths, but per turn (turn A, turn B and so on) the width has a constant value.

Structurally it may be desirable that the stepwise width variation of the electrode band occurs less abruptly than is shown in Fig. 2. To this end, for instance, the sharp electrode corners may be bevelled as is shown in dotted lines in Fig. 2 at 11.

To ensure a definite variation of the condenser curve it will sometimes be necessary to make the electrode width two or more succeeding spiral turns equal.

Finally it is pointed out that the invention may be used in the same way for other resonant circuits having rotational symmetry, for instance torus shaped resonant circuits and, moreover, for resonant circuits not having rotational symmetry, for instance circuits in which the inner and outer conductor have square cross-sections.

What I claim is:

1. A resonant circuit for ultra-short waves comprising two concentric conductors interconnected electrically at one end thereof, and a concentrated capacitance between said conductors at the other end thereof, said concentrated capacitance comprising a variable capacitor having spirally wound electrodes, one of said electrodes having a width varying in the longitudinal direction thereof, the width of successive convolutions of said spiral electrode varying stepwise after a whole number of convolutions thereof.

2. A resonant circuit for ultra-short waves comprising two concentric conductors interconnected electrically at one end thereof, and a concentrated capacitance between conductors at the other end thereof, said concentrated capacitance comprising a variable capacitor having spirally wound electrodes, one of said electrodes having a width varying in the longitudinal direction thereof, the width of successive convolutions of said spiral electrode varying stepwise after a whole number of convolutions thereof, the width between successive stepwise variations being substantially constant.

BAREND GERRIT FRUITHOF.

REFERENCES CITED

The following references are of record in the file of this patent:

UNITED STATES PATENTS

| Number | Name | Date |
|---|---|---|
| 1,525,778 | Hellmann | Feb. 10, 1925 |
| 1,552,185 | Alcox | Sept. 1, 1925 |
| 1,595,184 | Fuhrmann | Aug. 10, 1926 |
| 1,955,093 | Roosenstein | Apr. 17, 1934 |
| 2,171,219 | Malter | Aug. 29, 1939 |
| 2,201,199 | Peterson | May 21, 1940 |
| 2,251,085 | Unk | July 29, 1941 |

FOREIGN PATENTS

| Number | Country | Date |
|---|---|---|
| 523,888 | Great Britain | July 24, 1940 |